United States Patent
Zhao et al.

(10) Patent No.: US 9,735,865 B2
(45) Date of Patent: Aug. 15, 2017

(54) METHOD, APPARATUS AND SYSTEM FOR DETECTING OPTICAL NETWORK

(71) Applicant: Huawei Technologies Co., Ltd., Shenzhen, Guangdong (CN)

(72) Inventors: Jun Zhao, Shenzhen (CN); Biao Qi, Wuhan (CN); Xishe Liu, Shenzhen (CN); Jinlin Zhou, Wuhan (CN); Qi Li, Wuhan (CN); Libing Zhou, Leuven (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/880,919

(22) Filed: Oct. 12, 2015

(65) Prior Publication Data

US 2016/0036523 A1  Feb. 4, 2016

Related U.S. Application Data

(63) Continuation of application No. PCT/CN2014/084976, filed on Aug. 22, 2014.

(30) Foreign Application Priority Data

Aug. 30, 2013  (CN) .......................... 2013 1 0389084

(51) Int. Cl.
*H04B 10/071* (2013.01)
*H04B 10/272* (2013.01)
*H04B 10/077* (2013.01)

(52) U.S. Cl.
CPC ....... *H04B 10/071* (2013.01); *H04B 10/0771* (2013.01); *H04B 10/0773* (2013.01); *H04B 10/0775* (2013.01); *H04B 10/272* (2013.01)

(58) Field of Classification Search
CPC ............ H04L 7/0075; H04L 25/03159; H04L 27/0002; H04L 2025/03522;
(Continued)

(56) References Cited

U.S. PATENT DOCUMENTS

| | | |
|---|---|---|
| 5,737,105 A | 4/1998 | Ohta et al. |
| 2014/0098362 A1* | 4/2014 | Takahashi ............ G01M 11/319 356/73.1 |

FOREIGN PATENT DOCUMENTS

| | | |
|---|---|---|
| CN | 102055523 A | 5/2011 |
| CN | 102104421 A | 6/2011 |

(Continued)

*Primary Examiner* — Leslie Pascal (57) ABSTRACT

Embodiments of the present invention disclose a method, an apparatus, and a system for detecting an optical network. The method comprises: receiving, by a management device, a reflection peak power reported by a testing device, where the reflection peak power is a reflection peak power of an optical splitter that is obtained by the testing device according to a reflected optical signal, the reflected optical signal is an optical signal obtained by reflecting, by the optical splitter, a testing optical signal that is sent by the testing device and is transmitted to the optical splitter through an optical cable, and the optical splitter reflects the testing optical signal by using a reflective film disposed on an end surface of one optical output port. a detector does not need to carry a testing device to a site, to perform detection, efficiency of detecting performance of an optical network is improved.

8 Claims, 7 Drawing Sheets

(58) Field of Classification Search
CPC ... H04B 10/693; H04B 10/6163; H04B 10/071; H04B 10/075; H04B 10/073; H04B 10/0771; H04B 10/0775
See application file for complete search history.

(56) References Cited

FOREIGN PATENT DOCUMENTS

| | | | |
|---|---|---|---|
| CN | 102104423 A | 6/2011 | |
| CN | 102204127 A | 9/2011 | |
| CN | 102725975 A | 10/2012 | |
| CN | 202565272 U | 11/2012 | |
| CN | WO 2013097097 A1 * | 7/2013 | ........... H04B 10/071 |
| EP | 2 432 140 A1 | 3/2012 | |
| JP | 9-18411 A | 1/1997 | |
| JP | 2002-357782 A | 12/2002 | |
| JP | 2006-203823 A | 8/2006 | |
| JP | 2006-262381 A | 9/2006 | |
| JP | 2007064931 A | 3/2007 | |
| JP | 2007-205967 A | 8/2007 | |
| JP | WO 2012165587 A1 * | 12/2012 | ........... G01M 11/319 |
| WO | WO 2011/124169 A2 | 10/2011 | |

* cited by examiner

METHOD, APPARATUS AND SYSTEM FOR DETECTING OPTICAL NETWORK

CROSS-REFERENCE TO RELATED APPLICATIONS

This application is a continuation of International Application No. PCT/CN2014/084976, filed on Aug. 22, 2014, which claims priority to Chinese Patent Application No. 201310389084.8, filed on Aug. 30, 2013, both of which are hereby incorporated by reference in their entireties.

TECHNICAL FIELD

The present invention relates to the field of optical communications technologies, and in particular, to a method, an apparatus, and a system for detecting an optical network.

BACKGROUND

As a scale of a fiber network increases, a passive optical network (PON) technology gradually becomes a hotspot of optical access network technologies. A PON includes an optical line terminal (OLT), an optical distribution network (ODN), and an optical network unit (ONU). An important passive component in the optical distribution network is an optical splitter. The optical splitter can split and combine optical signals, and is used for allocation of an optical signal, connection of an optical path, control of a transmission direction of an optical signal, control of coupling between optical components, and the like. Because the optical splitter works in a high-temperature high-humidity environment for a long time, performance gradually deteriorates over time, which leads to an increase in a link loss until a link fails due to a large loss.

In order to ensure normal running of a PON, the PON usually needs to be detected before a service is activated, where the detection includes detection on a status of the optical splitter and detection on a loss situation of a fiber link. In the prior art, a detector usually needs to carry a testing device to a site at which an optical splitter is disposed, to perform detection. Therefore, detecting efficiency is low.

SUMMARY

Embodiments of the present invention provide a method, an apparatus, a device, and a system for detecting an optical network, and an optical splitter, to solve a problem of low efficiency of detecting an optical network in the prior art.

To solve the foregoing technical problem, the following technical solutions are disclosed in the embodiments of the present invention:

According to a first aspect, a method for detecting an optical network is provided, where the method includes:

receiving, by a management device, a reflection peak power reported by a testing device, where the reflection peak power is a reflection peak power of an optical splitter that is obtained by the testing device according to a reflected optical signal, the reflected optical signal is an optical signal obtained by reflecting, by the optical splitter, a testing optical signal that is sent by the testing device and is transmitted to the optical splitter through an optical cable, N+1 optical output ports are disposed on the optical splitter, N is a natural number, N optical output ports of the N+1 optical output ports are configured to transmit a received optical signal to N optical network units ONUs through N distribution optical fibers according to a ratio of 1:N, a reflective film is disposed on an end surface of one optical output port except the N optical output ports, and the testing optical signal is reflected by using the reflective film; and detecting the optical network by comparing the reflection peak power with a preset reflection power of the optical splitter.

With reference to the first aspect, in a first possible implementation manner of the first aspect, the detecting the optical network by comparing the reflection peak power with a preset reflection power of the optical splitter includes:

calculating a difference between the preset reflection power and the reflection peak power; and when the difference is less than a first power threshold, determining that a fiber link between the testing device and the optical splitter is normal and the optical splitter is normal; when the difference is between a first power threshold and a second power threshold, determining that a fiber link between the testing device and the optical splitter is faulty; or when the difference is between a second power threshold and a third power threshold, determining that the optical splitter is faulty, where the first power threshold is less than the second power threshold and the second power threshold is less than the third power threshold.

With reference to the first aspect or the first possible implementation manner of the first aspect, in a second possible implementation manner of the first aspect, the method further includes:

receiving a receiving time, which is reported by the testing device, of the reflected optical signal; and calculating a distance between the optical splitter and the testing device according to the receiving time.

With reference to the first aspect, the first possible implementation manner of the first aspect, or the second possible implementation manner of the first aspect, in a third possible implementation manner of the first aspect, when pre-detection before activation of a service is performed on the optical network, the preset reflection power is a theoretical value of a reflection power of the optical splitter; and when detection after activation of a service is performed on the optical network, the preset reflection power is a reflection power of the optical splitter during normal running of the service.

According to a second aspect, an apparatus for detecting an optical network is provided, where the apparatus includes:

a receiving unit, configured to receive a reflection peak power reported by a testing device, where the reflection peak power is a reflection peak power of an optical splitter that is obtained by the testing device according to a reflected optical signal, the reflected optical signal is an optical signal obtained by reflecting, by the optical splitter, a testing optical signal that is sent by the testing device and is transmitted to the optical splitter through an optical cable, N+1 optical output ports are disposed on the optical splitter, N is a natural number, N optical output ports of the N+1 optical output ports are configured to transmit a received optical signal to N optical network units ONUs through N distribution optical fibers according to a ratio of 1:N, a reflective film is disposed on an end surface of one optical output port except the N optical output ports, and the testing optical signal is reflected by using the reflective film; and a detecting unit, configured to detect the optical network by comparing the reflection peak power received by the receiving unit with a preset reflection power of the optical splitter.

With reference to the second aspect, in a first possible implementation manner of the second aspect, the detecting unit includes:

a difference calculating subunit, configured to calculate a difference between the preset reflection power and the reflection peak power received by the receiving unit; and a detection determining subunit, configured to: when the difference calculated by the difference calculating subunit is less than a first power threshold, determine that a fiber link between the testing device and the optical splitter is normal and the optical splitter is normal; when the difference calculated by the difference calculating subunit is between a first power threshold and a second power threshold, determine that a fiber link between the testing device and the optical splitter is faulty; or when the difference calculated by the difference calculating subunit is between a second power threshold and a third power threshold, determine that the optical splitter is faulty, where the first power threshold is less than the second power threshold and the second power threshold is less than the third power threshold.

With reference to the second aspect or the first possible implementation manner of the second aspect, in a second possible implementation manner of the second aspect, the receiving unit is further configured to receive a receiving time, which is reported by the testing device, of the reflected optical signal; and the apparatus further includes:

a calculating unit, configured to calculate a distance between the optical splitter and the testing device according to the receiving time received by the receiving unit.

According to a third aspect, a system for detecting an optical network is provided, where the system includes: a testing device, a management device, and an optical splitter, where the testing device is configured to send a testing optical signal; receive a reflected optical signal, where the reflected optical signal is an optical signal obtained by reflecting, by the optical splitter, the testing optical signal that is transmitted to the optical splitter through an optical cable; obtain a reflection peak power of the optical splitter according to the reflected optical signal; and report the reflection peak power to the management device;

the optical splitter is configured to transmit a received optical signal by using N optical output ports to N optical network units ONUs through N distribution optical fibers according to a ratio of 1:N, and reflect the testing optical signal by using a reflective film disposed on an end surface of one optical output port except the N optical output ports, so that the testing device receives the reflected optical signal, where N is a natural number; and the management device is configured to detect the optical network by comparing the reflection peak power with a preset reflection power of the optical splitter.

With reference to the third aspect, in a first possible implementation manner of the third aspect, the optical splitter is an optical splitter that reflects the testing optical signal according to a preset reflection ratio.

According to a fourth aspect, an optical splitter is provided, where the optical splitter includes: an optical input port and N+1 optical output ports, where a reflective film is disposed on an end surface of one optical output port of the N+1 optical output ports, and N is a natural number;

the N optical output ports are configured to transmit an optical signal received by the optical input port to N optical network units ONUs through N distribution optical fibers according to a ratio of 1:N; and the one optical output port is configured to reflect a testing optical signal by using the reflective film, where the testing optical signal is sent by a testing device and received by the optical input port, so that the testing device obtains a reflection peak power of the optical splitter according to a received reflected optical signal.

In the embodiments of the present invention, a testing device sends a testing optical signal and receives a reflected optical signal, where the reflected optical signal is an optical signal obtained by reflecting, by an optical splitter, the testing optical signal that is transmitted to the optical splitter through an optical cable, a reflective film is disposed on an end surface of one output port of the optical splitter, and the testing optical signal is reflected by using the reflective film; the testing device obtains a reflection peak power of the optical splitter according to the reflected optical signal and reports the reflection peak power to a management device; and the management device detects an optical network by comparing the reflection peak power with a preset reflection power of the optical splitter. Because an optical splitter having a reflective property is used in the embodiments of the present invention, a testing device can detect, at an optical line terminal, a status of an optical splitter and a status of a fiber link in an optical network by using a received optical signal reflected by the optical splitter. Because a detector does not need to carry a testing device to a site at which an optical splitter is disposed, to perform detection, efficiency of detecting performance of an optical network is improved.

BRIEF DESCRIPTION OF THE DRAWINGS

To describe the technical solutions in the embodiments of the present invention more clearly, the following briefly introduces the accompanying drawings required for describing the embodiments. Apparently, a person of ordinary skill in the art may still derive other drawings from these accompanying drawings without creative efforts.

DETAILED DESCRIPTION

To make a person skilled in the art understand the technical solutions in the embodiments of the present invention better, and make the objectives, features, and advantages of the embodiments of the present invention clearer, the following describes the technical solutions in the embodiments of the present invention in further detail with reference to the accompanying drawings.

An embodiment of the present invention provides a system for detecting an optical network. The system includes: a testing device, a management device, and an optical splitter, where the testing device is configured to send a testing optical signal; receive a reflected optical signal, where the reflected optical signal is an optical signal obtained by reflecting, by the optical splitter, the testing optical signal that is transmitted to the optical splitter through an optical cable; obtain a reflection peak power of the optical splitter according to the reflected optical signal; and report the reflection peak power to the management device; the optical splitter is configured to transmit a received optical signal by using N optical output ports to N optical network units ONUs through N distribution optical fibers according to a ratio of 1:N, and reflect the testing optical signal by using a reflective film disposed on an end surface of one optical output port except the N optical output ports, so that the testing device receives the reflected optical signal, where N is a natural number; and the management device is configured to detect the optical network by comparing the reflection peak power with a preset reflection power of the optical splitter.

Figure 1A:
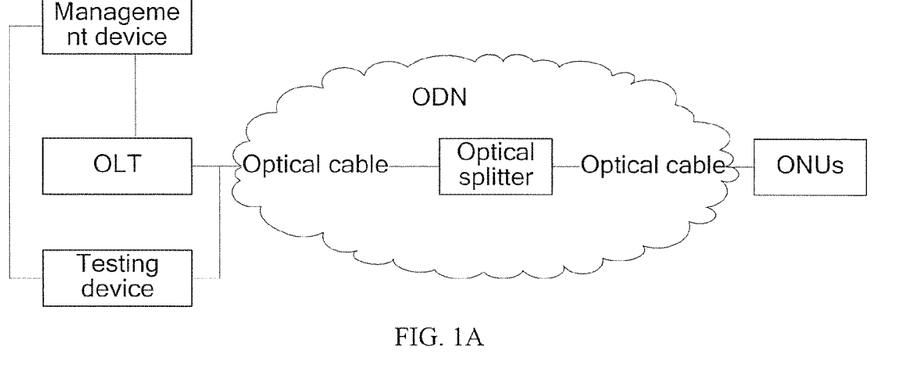
FIG. 1A is a schematic diagram of an architecture of a system for detecting an optical network according to an embodiment of the present invention.

Referring to FIG. 1A, FIG. 1A is a schematic diagram of an architecture of a system for detecting an optical network according to an embodiment of the present invention. The schematic diagram shows a PON system.

In this embodiment of the present invention, a PON includes an OLT installed at a central control station and multiple ONUs installed at user sites, and an ODN connecting the OLT and the ONUs includes an optical cable and an optical splitter. The optical splitter is a passive component. The optical splitter in this embodiment of the present invention not only includes N optical output ports configured to transmit an optical signal to the ONUS, but also includes one optical output port on which a reflective film is plated, so as to reflect a received testing optical signal.

In FIG. 1A, in order to detect a status of the optical splitter and a status of a fiber link between the OLT and the optical splitter in the PON, a testing device is disposed on the OLT side. The testing device is connected to a management device. The testing device sends a testing optical signal, and may report a reflection peak power of the optical splitter to the management device after receiving an optical signal reflected by the optical splitter, so as to implement detection on the status of the optical splitter and the status of the fiber link in the optical network.

Figure 1B:
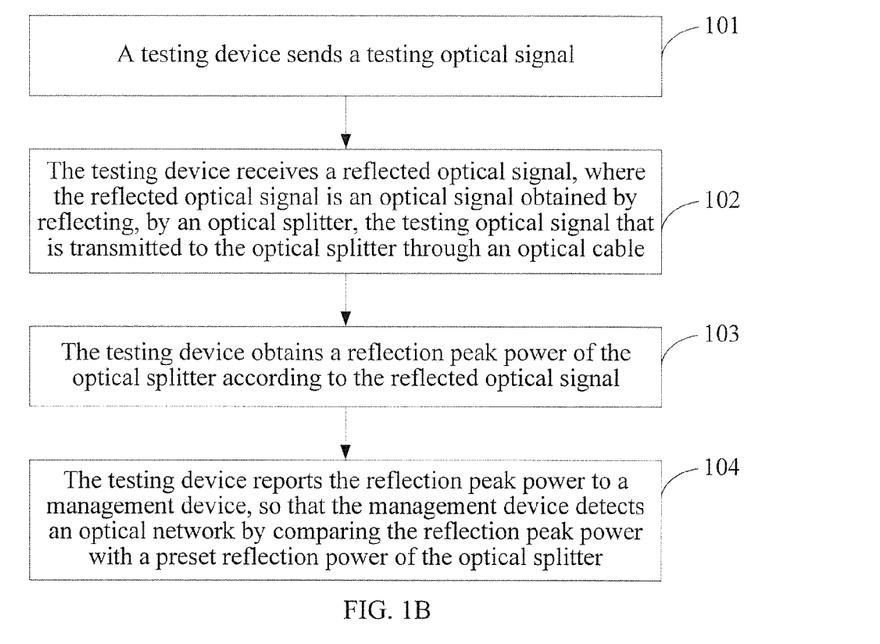
FIG. 1B is a flowchart of an embodiment of a method for detecting an optical network according to the present invention.

Referring to FIG. 1B, FIG. 1B is a flowchart of an embodiment of a method for detecting an optical network according to the present invention. This embodiment is described from the side of a testing device.

Step 101: The testing device sends a testing optical signal.

In this embodiment, the testing device may send the testing optical signal after receiving a testing instruction sent by a management device. The management device may send the testing instruction to the testing device before a PON service is activated, so as to perform pre-detection on a status of an optical splitter and a status of a fiber link in a PON before activation of the service; or the management device may send the testing instruction to the testing device during running of a PON service, so as to perform real-time detection on a status of an optical splitter and a status of a fiber link during running of the service.

Step 102: The testing device receives a reflected optical signal, where the reflected optical signal is an optical signal obtained by reflecting, by an optical splitter, the testing optical signal that is transmitted to the optical splitter through an optical cable.

With reference to FIG. 1A, it can be known that after the testing device sends the testing optical signal, the testing optical signal is transmitted to the optical splitter through the optical cable. The optical splitter in this embodiment has a function of reflecting an optical signal. Therefore, after the testing optical signal is transmitted to the optical splitter, the optical splitter may reflect the testing optical signal to the testing device, that is, enables the testing device to receive a reflected optical signal.

Compared with an optical splitter in the prior art, the optical splitter in this embodiment of the present invention is a novel optical splitter that can reflect a testing optical signal according to a preset reflection ratio. The novel optical splitter includes an optical input port and N+1 optical output ports, where a reflective film is disposed on an end surface of one optical output port of the N+1 optical output ports, and N is a natural number. The N optical output ports are configured to transmit an optical signal received by the optical input port to N optical network units ONUs through N distribution optical fibers according to a ratio of 1:N; and the one optical output port is configured to reflect a testing optical signal by using the reflective film, where the testing optical signal is sent by the testing device and received by the optical input port, so that the testing device obtains a reflection peak power of the optical splitter according to a received reflected optical signal. After the testing optical signal enters the novel optical splitter from a combining end, the testing optical signal is reflected by a reflector at a splitting end according to a preset reflection ratio, so that a reflected optical signal is generated.

Step 103: The testing device obtains a reflection peak power of the optical splitter according to the reflected optical signal.

After receiving the reflected optical signal, the testing device may obtain a reflection light power of the reflected optical signal, and then measure the reflection light power to obtain the reflection peak power of the optical splitter.

Step 104: The testing device reports the reflection peak power to the management device, so that the management device detects the optical network by comparing the reflection peak power with a preset reflection power of the optical splitter.

It can be seen from the foregoing embodiment that, an optical splitter having a reflective property is used in this embodiment, so that a testing device can detect, at an optical line terminal, a status of an optical splitter and a status of a fiber link in an optical network by using a received optical signal reflected by the optical splitter. Because a detector does not need to carry a testing device to a site at which an optical splitter is disposed, to perform detection, efficiency of detecting performance of an optical network is improved.

Figure 1C:
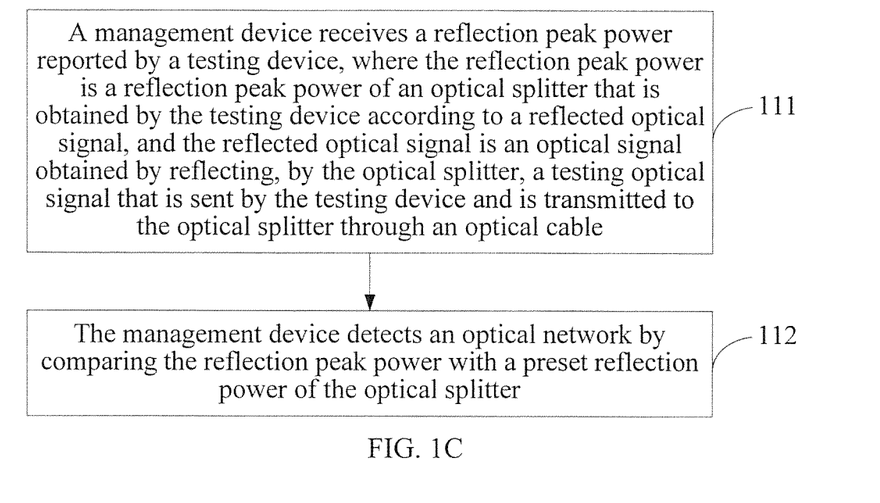
FIG. 1C is a flowchart of another embodiment of a method for detecting an optical network according to the present invention.

Referring to FIG. 1C, FIG. 1C is a flowchart of another embodiment of a method for detecting an optical network according to the present invention. This embodiment is described from the side of a management device.

Step 111: The management device receives a reflection peak power reported by a testing device, where the reflection peak power is a reflection peak power of an optical splitter that is obtained by the testing device according to a reflected optical signal, and the reflected optical signal is an optical signal obtained by reflecting, by the optical splitter, a testing optical signal that is sent by the testing device and is transmitted to the optical splitter through an optical cable.

In this embodiment, the management device may send a testing instruction to the testing device, so as to trigger the testing device to send the testing optical signal. The management device may send the testing instruction to the testing device before a PON service is activated, so as to perform pre-detection on a status of an optical splitter and a status of a fiber link in a PON before activation of the service; or the management device may send the testing instruction to the testing device during running of a PON service, so as to perform real-time detection on a status of an optical splitter and a status of a fiber link during running of the service.

Step 112: The management device detects the optical network by comparing the reflection peak power with a preset reflection power of the optical splitter.

The management device may calculate a difference between the preset reflection power and the reflection peak power; and when the difference is less than a first power threshold, determine that a fiber link between the testing device and the optical splitter is normal and the optical splitter is normal; when the difference is between a first power threshold and a second power threshold, determine that a fiber link between the testing device and the optical splitter is faulty; or when the difference is between a second power threshold and a third power threshold, determine that the optical splitter is faulty. In this embodiment, because the testing device is disposed on the side of an OLT, the detected status of the fiber link between the testing device and the optical splitter is a status of a fiber link of an optical able between the OLT and the optical splitter. The first power threshold is less than the second power threshold, and the second power threshold is less than the third power threshold. The first power threshold, the second power threshold, and the third power threshold may be set flexibly according to different types of optical components in a PON and different structures of optical links, which is not limited in this embodiment of the present invention.

In this embodiment, when pre-detection before activation of a service is performed on the optical network, the preset reflection power may be a theoretical value of a reflection power of the optical splitter; and when detection after activation of a service is performed on the optical network, the preset reflection power may be a reflection power of the optical splitter during normal running of the service.

It can be seen from the foregoing embodiment that, an optical splitter having a reflective property is used in this embodiment, so that a testing device can detect, at an optical line terminal, a status of an optical splitter and a status of a fiber link in an optical network by using a received optical signal reflected by the optical splitter. Because a detector does not need to carry a testing device to a site at which an optical splitter is disposed, to perform detection, efficiency of detecting performance of an optical network is improved.

Figure 2:
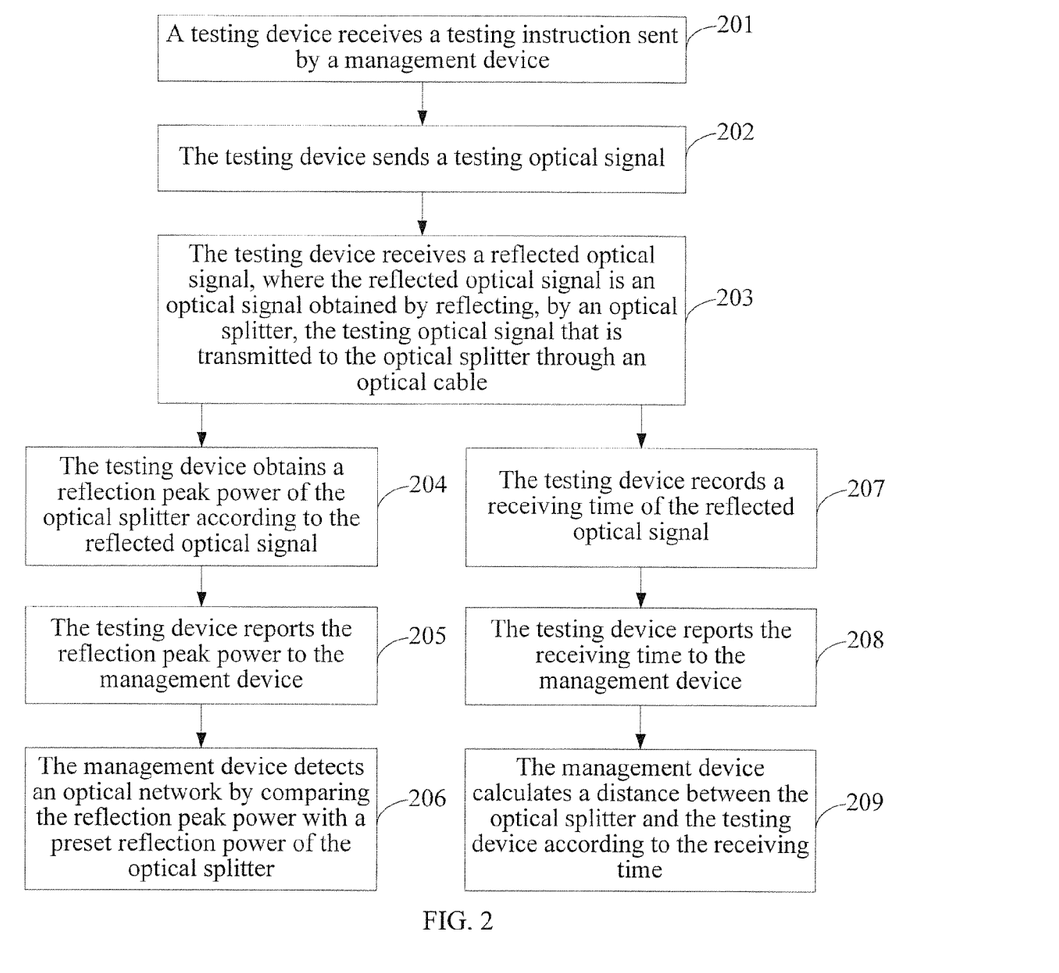
FIG. 2 is a flowchart of another embodiment of a method for detecting an optical network according to the present invention.

Referring to FIG. 2, FIG. 2 shows another embodiment of a method for detecting an optical network according to the present invention. In this embodiment, a process of detecting the optical network is described in detail by means of a description of interaction between a management device and a testing device.

Step 201: A testing device receives a testing instruction sent by a management device.

In this embodiment, the management device may send the testing instruction to the testing device before a PON service is activated, so as to perform pre-detection on a status of an optical splitter and a status of a fiber link in a PON before activation of the service; or the management device may send the testing instruction to the testing device during running of a PON service, so as to perform real-time detection on a status of an optical splitter and a status of a fiber link during running of the service.

Step 202: The testing device sends a testing optical signal.

After receiving the testing instruction sent by the management device, the testing device sends the testing optical signal. With reference to FIG. 1A, it can be known that the testing optical signal is transmitted to an optical splitter through an optical cable.

The optical splitter in this embodiment includes an optical input port and N+1 optical output ports, where a reflective film is disposed on an end surface of one optical output port of the N+1 optical output ports, and N is a natural number. The N optical output ports are configured to transmit an optical signal received by the optical input port to N optical network units ONUs through N distribution optical fibers according to a ratio of 1:N; and the one optical output port is configured to reflect a testing optical signal by using the reflective film, where the testing optical signal is sent by the testing device and received by the optical input port, so that the testing device obtains a reflection peak power of the optical splitter according to a received reflected optical signal.

Step 203: The testing device receives a reflected optical signal, where the reflected optical signal is an optical signal obtained by reflecting, by an optical splitter, the testing optical signal that is transmitted to the optical splitter through an optical cable, and performs step 204 and step 207 separately.

In this embodiment, the optical splitter has a function of reflecting an optical signal. Therefore, after the testing optical signal sent by the testing device is transmitted to the optical splitter, the optical splitter may reflect the testing optical signal to the testing device, that is, enables the testing device to receive a reflected optical signal.

Compared with an optical splitter in the prior art, the optical splitter in this embodiment of the present invention is a novel optical splitter that can reflect a testing optical signal according to a preset reflection ratio. After the testing optical signal enters the novel optical splitter from a combining end, the testing optical signal is reflected by a reflector at a splitting end according to a preset reflection ratio, so that a reflected optical signal is generated.

Step 204: The testing device obtains a reflection peak power of the optical splitter according to the reflected optical signal.

After receiving the reflected optical signal, the testing device may directly obtain a reflection light power of the reflected optical signal, and obtain the reflection peak power of the optical splitter by measuring the reflection light power. A process of obtaining the reflection peak power by measuring the reflection light power is the same as that in the prior art, and is not further described herein.

Step 205: The testing device reports the reflection peak power to the management device.

Step 206: The management device detects the optical network by comparing the reflection peak power with a preset reflection power of the optical splitter. The current process ends.

The management device may calculate a difference between the preset reflection power and the reflection peak power; and when the difference is less than a first power threshold, determine that a fiber link between the testing device and the optical splitter is normal and the optical splitter is normal; when the difference is between a first power threshold and a second power threshold, determine that a fiber link between the testing device and the optical splitter is faulty; or when the difference is between a second power threshold and a third power threshold, determine that the optical splitter is faulty. In this embodiment, because the testing device is disposed on the side of an OLT, the detected status of the fiber link between the testing device and the optical splitter is a status of a fiber link of an optical able between the OLT and the optical splitter. The first power threshold is less than the second power threshold, and the second power threshold is less than the third power threshold. The first power threshold, the second power threshold, and the third power threshold may be set flexibly according to different types of optical components in a PON and different structures of optical links, which is not limited in this embodiment of the present invention.

Step 207: The testing device records a receiving time of the reflected optical signal.

Step 208: The testing device reports the receiving time to the management device.

Step 209: The management device calculates a distance between the optical splitter and the testing device according to the receiving time. The current process ends.

In this embodiment, the testing device reports the recorded receiving time to the management device after receiving the reflected optical signal, and the management device may calculate, according to the receiving time, a time from the sending of the testing optical signal to the receiving of the reflected optical signal by the testing device, so as to calculate the distance between the optical splitter and the testing device according to a product of the speed of light and the time. As a part in PON detection, the management device may obtain a geographical setting situation of the optical splitter according to the distance, which is obtained by means of calculation, between the optical splitter and the testing device.

It can be seen from the foregoing embodiment that, an optical splitter having a reflective property is used in this embodiment, so that a testing device can detect, at an optical line terminal, a status of an optical splitter and a status of a fiber link in an optical network by using a received optical signal reflected by the optical splitter. Because a detector does not need to carry a testing device to a site at which an optical splitter is disposed, to perform detection, efficiency of detecting performance of an optical network is improved.

Figure 3A:
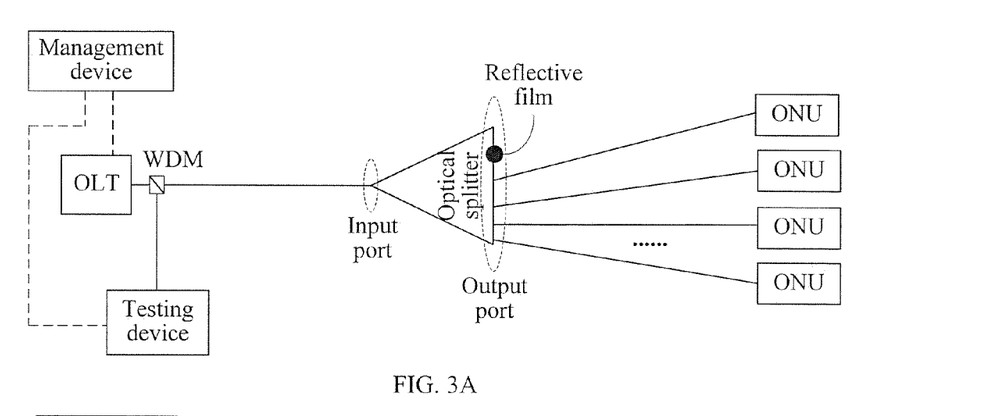
FIG. 3A is a schematic diagram of an optical network detecting architecture to which an embodiment of the present invention is applied.

Referring to FIG. 3A, FIG. 3A is a schematic diagram of an optical network detecting architecture to which an embodiment of the present invention is applied.

In FIG. 3A, a management device is connected to an OLT and a testing device. The testing device is connected to a trunk optical cable between the OLT and an optical splitter by using a wavelength division multiplexing (WDM) device. A PON architecture shown in FIG. 3A is a one-level optical splitting architecture, that is, only one optical splitter is disposed between the OLT and ONUs. The one-level optical splitting architecture is usually applied to a place in which users are concentrated, so as to reduce costs of optical cables, and facilitate maintenance due to a small number of network nodes.

With reference to FIG. 3A, it is assumed that a current stage is a pre-detection stage before activation of a PON service, a split ratio of a first-level optical splitter is 1:N, for example, 1:32, and a theoretical value of a reflection power of the optical splitter is x dB. It should be noted that the theoretical value of the reflection power of the optical splitter is related to a status of the optical splitter, and when the status of the optical splitter deteriorates, the theoretical value may decrease, which is not limited in this embodiment of the present invention. A layer of reflective film is plated on a reflecting port at an output end of the first-level optical splitter, which is used to reflect a received testing optical signal.

After receiving a testing instruction sent by the management device, the testing device sends a testing optical signal, where a wavelength of the testing optical signal may be 1625 nm (nanometer) or 1650 nm. After being transmitted to the first-level optical splitter through an optical cable, the testing optical signal is reflected by the reflective film of the reflecting port of the first-level optical splitter, and correspondingly, the testing device receives a reflected optical signal. The testing device may measure the reflected optical signal to obtain a reflection peak power x' dB of the first-level optical splitter; the testing device reports the reflection peak power x' dB to the management device; and the management device calculates a difference between x and x'; and if the difference is less than a first power threshold W1, determines that the first-level optical splitter is normal and a fiber link between the OLT and the first-level optical splitter is normal; if the difference is between a first power threshold W1 and a second power threshold W2, determines that a fiber link between the OLT and the first-level optical splitter is faulty; or if the difference is between a second power threshold W2 and a third power threshold W3, determines that the first-level optical splitter is faulty. W1 is less than W2, W2 is less than W3, and W1, W2, and W3 may be set flexibly according to different types of optical components in a PON and different structures of optical links, which is not limited in this embodiment of the present invention.

Figure 3B:
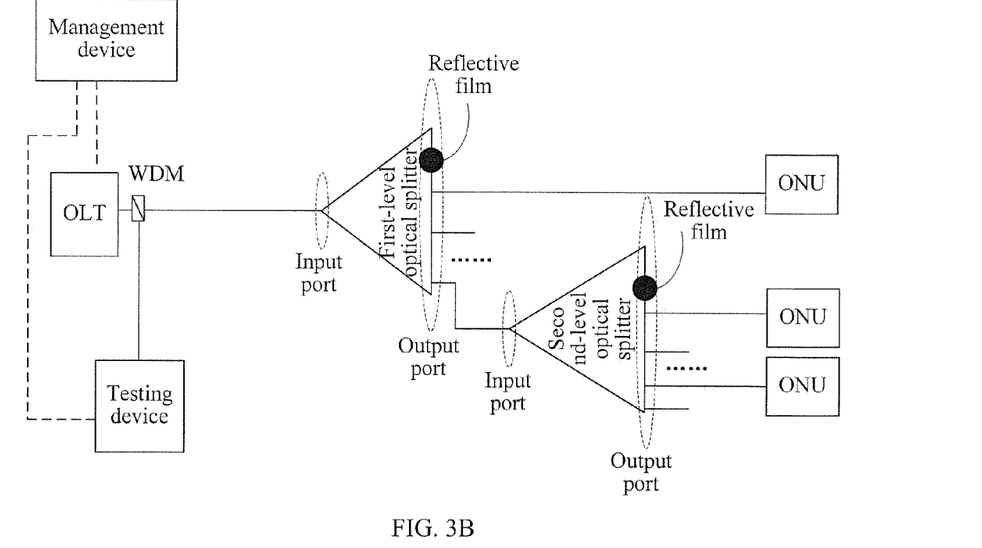
FIG. 3B is a schematic diagram of another optical network detecting architecture to which an embodiment of the present invention is applied.

Referring to FIG. 3B, FIG. 3B is a schematic diagram of another optical network detecting architecture to which an embodiment of the present invention is applied.

In FIG. 3B, a management device is connected to an OLT and a testing device. The testing device is connected to a trunk optical cable between the OLT and an optical splitter by using a WDM device. A PON architecture shown in FIG. 3B is a two-level optical splitting architecture, that is, two optical splitters, which are a first-level optical splitter and a second-level optical splitter, are disposed between the OLT and ONUs. The two-level optical splitting architecture is usually applied to a place in which users are sparsely distributed, and a manner of thin coverage is used to save a resource.

With reference to the FIG. 3B, it is assumed that a current stage is a real-time detection stage after activation of a PON service, a split ratio of the first-level optical splitter is 1:M, for example, 1:4, and a split ratio of the second-level optical splitter is 1:M', for example, 1:16; and it is assumed that during normal running of the service, an obtained reflection power of the first-level optical splitter is y1, and an obtained reflection power of the second-level optical splitter is y2. A layer of reflective film is plated on a reflecting port at an output end of each of the first-level optical splitter and the second-level optical splitter, which is used to reflect a received testing optical signal.

After receiving a testing instruction sent by the management device, the testing device sends a testing optical signal, where a wavelength of the testing optical signal may be 1520 nm. The testing optical signal is transmitted to the first-level optical splitter through an optical cable and is then transmitted from the first-level optical splitter to the second-level optical splitter. The testing optical signal that is transmitted to the first-level optical splitter is first reflected back to the testing device by the reflective film of the reflecting port of the first-level optical splitter, so that the testing device receives a first reflected optical signal; and then the testing optical signal that is transmitted to the second-level optical splitter is reflected back to the testing device by the reflective film of the reflecting port of the second-level optical splitter, so that the testing device receives a second reflected optical signal. The testing device may test the first reflected optical signal to obtain a reflection peak power y1' of the first-level optical splitter, and test the second reflected optical signal to obtain a reflection peak power y2 of the second-level optical splitter; the testing device reports the reflection peak power y1' of the first-level optical splitter and the reflection peak power y2' of the second-level optical splitter to the management device; and the management device calculates a difference between y1 and y1', and detects a status of a fiber link between the OLT and the first-level optical splitter and a status of the first-level optical splitter according to the difference. A specific detecting process is the same as the foregoing process of detecting the status of the fiber link between the OLT and the first-level optical splitter and the status of the first-level optical splitter according to the difference between x and x' shown in FIG. 3A, and is not repeated herein. Similarly, the management device calculates a difference between y2 and y2', and detects a status of a fiber link between the OLT and the second-level optical splitter and a status of the second-level optical splitter according to the difference. When it is detected that the fiber link between the OLT and the first-level optical splitter is normal but the fiber link between the OLT and the second-level optical splitter is faulty, it may be further determined that a fiber link between the first-level optical splitter and the second-level optical splitter is faulty.

The present invention further provides embodiments of an apparatus for detecting an optical network, a testing device, and a management device, which correspond to the embodiments of the method for detecting an optical network according to the present invention.

Figure 4:
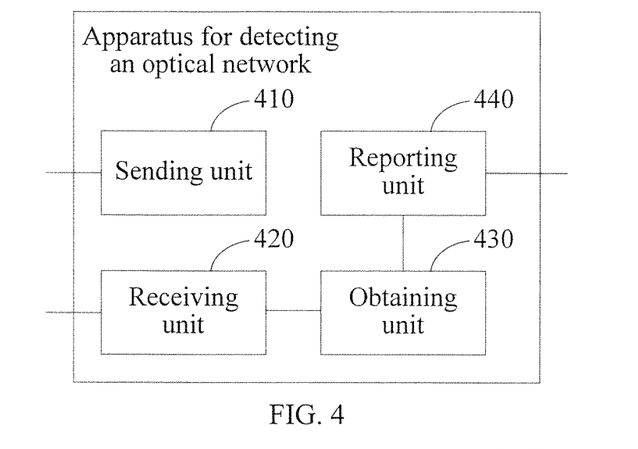
FIG. 4 is a block diagram of an embodiment of an apparatus for detecting an optical network according to the present invention.

Referring to FIG. 4, FIG. 4 is a block diagram of an embodiment of an apparatus for detecting an optical network according to the present invention. The apparatus may be disposed in a testing device.

The apparatus includes: a sending unit 410, a receiving unit 420, an obtaining unit 430, and a reporting unit 440, where the sending unit 410 is configured to send a testing optical signal;

the receiving unit 420 is configured to receive a reflected optical signal, where the reflected optical signal is an optical signal obtained by reflecting, by an optical splitter, the testing optical signal that is sent by the sending unit 410 and is transmitted to the optical splitter through an optical cable, N+1 optical output ports are disposed on the optical splitter, N is a natural number, N optical output ports of the N+1 optical output ports are configured to transmit a received optical signal to N optical network units ONUs through N distribution optical fibers according to a ratio of 1:N, a reflective film is disposed on an end surface of one optical output port except the N optical output ports, and the testing optical signal is reflected by using the reflective film;

the obtaining unit 430 is configured to obtain a reflection peak power of the optical splitter according to the reflected optical signal received by the receiving unit 420; and the reporting unit 440 is configured to report the reflection peak power obtained by the obtaining unit 430 to a management device, so that the management device detects the optical network by comparing the reflection peak power with a preset reflection power of the optical splitter.

Optionally, the obtaining unit 430 may include (not shown in FIG. 4):

a reflection light power obtaining subunit, configured to obtain a reflection light power of the reflected optical signal; and a reflection peak power measuring subunit, configured to measure the reflection light power obtained by the reflection light power obtaining subunit, to obtain the reflection peak power of the optical splitter.

Figure 5:
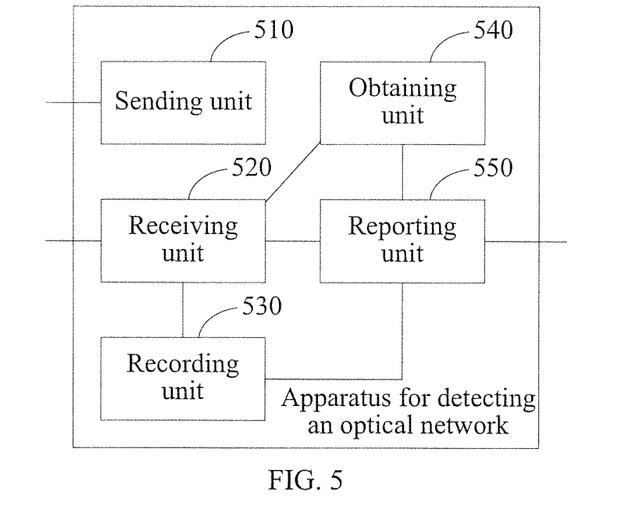
FIG. 5 is a block diagram of another embodiment of an apparatus for detecting an optical network according to the present invention.

Referring to FIG. 5, FIG. 5 is a block diagram of another embodiment of an apparatus for detecting an optical network according to the present invention. The apparatus may be disposed in a testing device.

The apparatus includes: a sending unit 510, a receiving unit 520, a recording unit 530, an obtaining unit 540, and a reporting unit 550, where the sending unit 510 is configured to send a testing optical signal;

the receiving unit 520 is configured to receive a reflected optical signal, where the reflected optical signal is an optical signal obtained by reflecting, by an optical splitter, the testing optical signal that is sent by the sending unit 510 and is transmitted to the optical splitter through an optical cable, N+1 optical output ports are disposed on the optical splitter, N is a natural number, N optical output ports of the N+1 optical output ports are configured to transmit a received optical signal to N optical network units ONUs through N distribution optical fibers according to a ratio of 1:N, a reflective film is disposed on an end surface of one optical output port except the N optical output ports, and the testing optical signal is reflected by using the reflective film;

the recording unit 530 is configured to record a receiving time of the reflected optical signal received by the receiving unit 520;

the obtaining unit 540 is configured to obtain a reflection peak power of the optical splitter according to the reflected optical signal received by the receiving unit 520; and the reporting unit 550 is configured to report the receiving time recorded by the recording unit 530 to a management device, so that the management device calculates a distance between the optical splitter and the testing device according to the receiving time; and report the reflection peak power obtained by the obtaining unit 540 to the management device, so that the management device detects the optical network by comparing the reflection peak power with a preset reflection power of the optical splitter.

Optionally, the obtaining unit 540 may include (not shown in FIG. 5):

a reflection light power obtaining subunit, configured to obtain a reflection light power of the reflected optical signal; and a reflection peak power measuring subunit, configured to measure the reflection light power obtained by the reflection light power obtaining subunit, to obtain the reflection peak power of the optical splitter.

Figure 6:
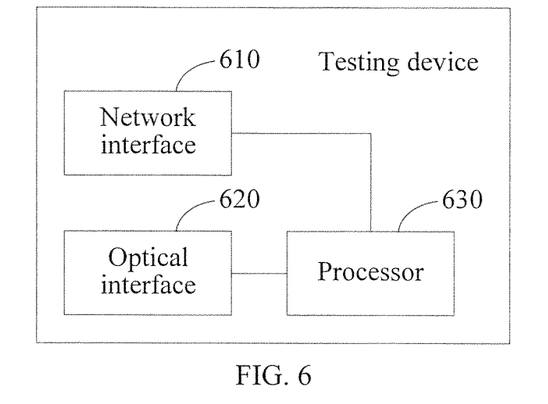
FIG. 6 is a block diagram of an embodiment of a testing device according to the present invention.

Referring to FIG. 6, FIG. 6 is a block diagram of an embodiment of a testing device according to the present invention.

The testing device includes: a network interface 610, an optical interface 620, and a processor 630, where the optical interface 620 is configured to send a testing optical signal and receive a reflected optical signal, where the reflected optical signal is an optical signal obtained by reflecting, by an optical splitter, the testing optical signal that is transmitted to the optical splitter through an optical cable, N+1 optical output ports are disposed on the optical splitter, N is a natural number, N optical output ports of the N+1 optical output ports are configured to transmit a received optical signal to N optical network units ONUs through N distribution optical fibers according to a ratio of 1:N, a reflective film is disposed on an end surface of one optical output port except the N optical output ports, and the testing optical signal is reflected by using the reflective film; and the processor 630 is configured to obtain a reflection peak power of the optical splitter according to the reflected optical signal, and report the reflection peak power to a management device through the network interface 610, so that the management device detects the optical network by comparing the reflection peak power with a preset reflection power of the optical splitter.

Optionally, the processor 630 may be specifically configured to obtain a reflection light power of the reflected optical signal, and measure the reflection light power to obtain the reflection peak power of the optical splitter.

Optionally, the processor 630 may be further configured to record a receiving time of the reflected optical signal, and report the receiving time to the management device through the network interface, so that the management device calculates a distance between the optical splitter and the testing device according to the receiving time.

Figure 7:
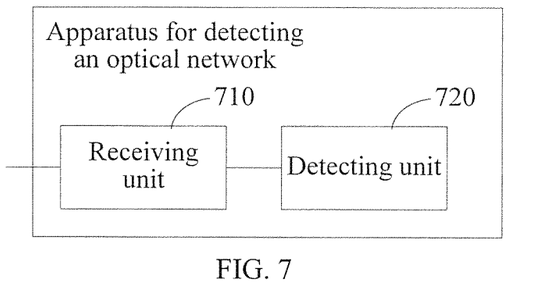
FIG. 7 is a block diagram of another embodiment of an apparatus for detecting an optical network according to the present invention.

Referring to FIG. 7, FIG. 7 is a block diagram of another embodiment of an apparatus for detecting an optical network according to the present invention. The apparatus may be disposed in a management device.

The apparatus includes: a receiving unit 710 and a detecting unit 720, where the receiving unit 710 is configured to receive a reflection peak power reported by a testing device, where the reflection peak power is a reflection peak power of an optical splitter that is obtained by the testing device according to a reflected optical signal, the reflected optical signal is an optical signal obtained by reflecting, by the optical splitter, a testing optical signal that is sent by the testing device and is transmitted to the optical splitter through an optical cable, N+1 optical output ports are disposed on the optical splitter, N is a natural number, N optical output ports of the N+1 optical output ports are configured to transmit a received optical signal to N optical network units ONUs through N distribution optical fibers according to a ratio of 1:N, a reflective film is disposed on an end surface of one optical output port except the N optical output ports, and the testing optical signal is reflected by using the reflective film; and the detecting unit 720 is configured to detect the optical network by comparing the reflection peak power received by the receiving unit 710 with a preset reflection power of the optical splitter.

Optionally, the detecting unit 720 may include (not shown in FIG. 7):

a difference calculating subunit, configured to calculate a difference between the preset reflection power and the reflection peak power received by the receiving unit; and a detection determining subunit, configured to: when the difference calculated by the difference calculating subunit is less than a first power threshold, determine that a fiber link between the testing device and the optical splitter is normal and the optical splitter is normal; when the difference calculated by the difference calculating subunit is between a first power threshold and a second power threshold, determine that a fiber link between the testing device and the optical splitter is faulty; or when the difference calculated by the difference calculating subunit is between a second power threshold and a third power threshold, determine that the optical splitter is faulty.

Figure 8:
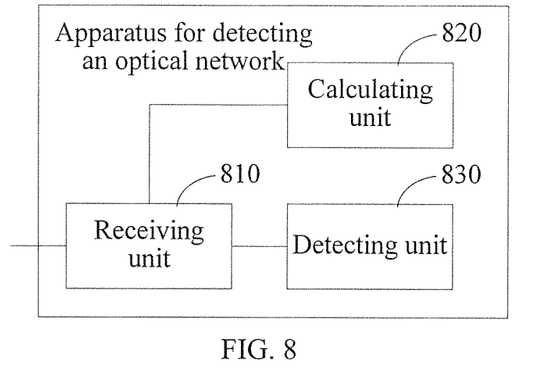
FIG. 8 is a block diagram of another embodiment of an apparatus for detecting an optical network according to the present invention.

Referring to FIG. 8, FIG. 8 is a block diagram of another embodiment of an apparatus for detecting an optical network according to the present invention. The apparatus may be disposed in a management device.

The apparatus includes: a receiving unit 810, calculating unit 820, and a detecting unit 830, where the receiving unit 810 is configured to receive a reflection peak power reported by a testing device, where the reflection peak power is a reflection peak power of an optical splitter that is obtained by the testing device according to a reflected optical signal, and the reflected optical signal is an optical signal obtained by reflecting, by the optical splitter, a testing optical signal that is sent by the testing device and is transmitted to the optical splitter through an optical cable; and receive a receiving time, which is reported by the testing device, of the reflected optical signal, where N+1 optical output ports are disposed on the optical splitter, N is a natural number, N optical output ports of the N+1 optical output ports are configured to transmit a received optical signal to N optical network units ONUs through N distribution optical fibers according to a ratio of 1:N, a reflective film is disposed on an end surface of one optical output port except the N optical output ports, and the testing optical signal is reflected by using the reflective film;

the calculating unit 820 is configured to calculate a distance between the optical splitter and the testing device according to the receiving time received by the receiving unit 810; and the detecting unit 830 is configured to detect the optical network by comparing the reflection peak power received by the receiving unit 810 with a preset reflection power of the optical splitter.

Optionally, the detecting unit 830 may include (not shown in FIG. 8):

a difference calculating subunit, configured to calculate a difference between the preset reflection power and the reflection peak power received by the receiving unit; and a detection determining subunit, configured to: when the difference calculated by the difference calculating subunit is less than a first power threshold, determine that a fiber link between the testing device and the optical splitter is normal and the optical splitter is normal; when the difference calculated by the difference calculating subunit is between a first power threshold and a second power threshold, determine that a fiber link between the testing device and the optical splitter is faulty; or when the difference calculated by the difference calculating subunit is between a second power threshold and a third power threshold, determine that the optical splitter is faulty.

Figure 9:
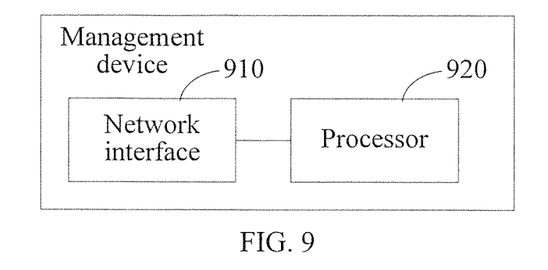
FIG. 9 is a block diagram of an embodiment of a management device according to the present invention.

Referring to FIG. 9, FIG. 9 is a block diagram of an embodiment of a management device according to the present invention.

The management device includes: a network interface 910 and a processor 920, where the network interface 910 is configured to receive a reflection peak power reported by a testing device, where the reflection peak power is a reflection peak power of an optical splitter that is obtained by the testing device according to a reflected optical signal, the reflected optical signal is an optical signal obtained by reflecting, by the optical splitter, a testing optical signal that is sent by the testing device and is transmitted to the optical splitter through an optical cable, N+1 optical output ports are disposed on the optical splitter, N is a natural number, N optical output ports of the N+1 optical output ports are configured to transmit a received optical signal to N optical network units ONUS through N distribution optical fibers according to a ratio of 1:N, a reflective film is disposed on an end surface of one optical output port except the N optical output ports, and the testing optical signal is reflected by using the reflective film; and the processor 920 is configured to detect the optical network by comparing the reflection peak power with a preset reflection power of the optical splitter.

Optionally, the processor 920 may be specifically configured to calculate a difference between the preset reflection power and the reflection peak power; and when the difference is less than a first power threshold, determine that a fiber link between the testing device and the optical splitter is normal and the optical splitter is normal; when the difference is between a first power threshold and a second power threshold, determine that a fiber link between the testing device and the optical splitter is faulty; or when the difference is between a second power threshold and a third power threshold, determine that the optical splitter is faulty, where the first power threshold is less than the second power threshold, and the second power threshold is less than the third power threshold.

Optionally, the network interface 910 may be further configured to receive a receiving time, which is reported by the testing device, of the reflected optical signal; and the processor 920 may be further configured to calculate a distance between the optical splitter and the testing device according to the receiving time.

It can be seen from the foregoing embodiments that, a testing device sends a testing optical signal and receives a reflected optical signal, where the reflected optical signal is an optical signal obtained by reflecting, by an optical splitter, the testing optical signal that is transmitted to the optical splitter through an optical cable, a reflective film is disposed on an end surface of one output port of the optical splitter, and the testing optical signal is reflected by using the reflective film; the testing device obtains a reflection peak power of the optical splitter according to the reflected optical signal and reports the reflection peak power to a management device; and the management device detects an optical network by comparing the reflection peak power with a preset reflection power of the optical splitter. Because an optical splitter having a reflective property is used in the embodiments of the present invention, a testing device can detect, at an optical line terminal, a status of an optical splitter and a status of a fiber link in an optical network by using a received optical signal reflected by the optical splitter. Because a detector does not need to carry a testing device to a site at which an optical splitter is disposed, to perform detection, efficiency of detecting performance of an optical network is improved.

A person skilled in the art may clearly understand that, the technologies in the embodiments of the present invention may be implemented by software in addition to a necessary general hardware platform. Based on such an understanding, the technical solutions in the embodiments of the present invention essentially, or the part contributing to the prior art may be implemented in the form of a software product. The software product is stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for determining operating characteristics of a fiber link and/or optical splitter, the method comprising:
   receiving, by a management device, a reflection peak power reported by a testing device, wherein the reflection peak power is a reflection peak power of an optical splitter that is obtained by the testing device according to a reflected optical signal, the reflected optical signal is an optical signal obtained by reflecting, by the optical splitter, a testing optical signal that is sent by the testing device and is transmitted to the optical splitter through an optical cable, N+1 optical output ports are disposed on the optical splitter, N is a natural number, N optical output ports of the N+1 optical output ports are configured to transmit a received optical signal to N optical network units (ONUs) through N distribution optical fibers according to a ratio of 1:N, a reflective film is disposed on an end surface of one optical output port except the N optical output ports, and the testing optical signal is reflected by using the reflective film;
   wherein the determining operating characteristics of a fiber link and/or an optical splitter comprises:
      comparing a reflection peak power of the reflected test optical signal with a preset reflection power of the optical splitter by calculating a difference between the preset reflection power and the reflection peak power,
      when the difference is less than a first power threshold, determining that a fiber link between the testing device and the optical splitter is normal and the optical splitter is normal,
      when the difference is between a first power threshold and a second power threshold, determining that a fiber link between the testing device and the optical splitter is faulty,
      when the difference is between a second power threshold and a third power threshold, determining that the optical splitter is faulty; and
      wherein the first power threshold is less than the second power threshold, and the second power threshold is less than the third power threshold.

2. The method according to claim 1, wherein the method further comprises:

receiving a receiving time, which is reported by the testing device, of the reflected optical signal; and
calculating a distance between the optical splitter and the testing device according to the receiving time.

3. The method according to claim 1, wherein the method further comprises:
receiving a receiving time, which is reported by the testing device, of the reflected optical signal; and
calculating a distance between the optical splitter and the testing device according to the receiving time.

4. The method according to claim 1, wherein
when pre-detection before activation of a service is performed on the optical network, the preset reflection power is a theoretical value of a reflection power of the optical splitter; and
when detection after activation of a service is performed on the optical network, the preset reflection power is a reflection power of the optical splitter during normal running of the service.

5. An apparatus for determining operating characteristics of a fiber link and/or optical splitter, the apparatus comprising:
a receiver, configured to receive a reflection peak power reported by a testing device, wherein the reflection peak power is a reflection peak power of an optical splitter that is obtained by the testing device according to a reflected optical signal, the reflected optical signal is an optical signal obtained by reflecting, by the optical splitter, a testing optical signal that is sent by the testing device and is transmitted to the optical splitter through an optical cable, N+1 optical output ports are disposed on the optical splitter, N is a natural number, N optical output ports of the N+1 optical output ports are configured to transmit a received optical signal to N optical network units (ONUs) through N distribution optical fibers according to a ratio of 1:N, a reflective film is disposed on an end surface of one optical output port except the N optical output ports, and the testing optical signal is reflected by using the reflective film; and
a detector, wherein the detector comprises:
a difference calculator, configured to calculate a difference between the preset reflection power and the reflection peak power received by the receiver; and
a detection determiner, configured to:
when the difference calculated by the difference calculator is less than a first power threshold, determine that a fiber link between the testing device and the optical splitter is normal and the optical splitter is normal, or
when the difference calculated by the difference calculator is between a first power threshold and a second power threshold, determine that a fiber link between the testing device and the optical splitter is faulty, or
when the difference calculated by the difference calculator is between a second power threshold and a third power threshold, determine that the optical splitter is faulty, wherein the first power threshold is less than the second power threshold and the second power threshold is less than the third power threshold.

6. The apparatus according to claim 5, wherein:
the receiver is further configured to receive a receiving time, which is reported by the testing device, of the reflected optical signal; and
the apparatus further comprises:
a calculator, configured to calculate a distance between the optical splitter and the testing device according to the receiving time received by the receiver.

7. A system for determining operating characteristics of a fiber link and/or optical splitter, the system comprising:
a testing device;
a management device; and
an optical splitter;
wherein the testing device is configured to:
send a testing optical signal,
receive a reflected optical signal, wherein the reflected optical signal is an optical signal obtained by reflecting, by the optical splitter, the testing optical signal that is transmitted to the optical splitter through an optical cable,
obtain a reflection peak power of the optical splitter according to the reflected optical signal, and
report the reflection peak power to the management device;
wherein the optical splitter is configured to:
transmit a received optical signal by using N optical output ports to N optical network units (ONUs) through N distribution optical fibers according to a ratio of 1:N, and
reflect the testing optical signal by using a reflective film disposed on an end surface of one optical output port except the N optical output ports, so that the testing device receives the reflected optical signal, wherein N is a natural number; and
wherein the management device is configured to:
compare a reflection peak power of the reflected test optical signal with a preset reflection power of the optical splitter by calculating a difference between the preset reflection power and the reflection peak power,
when the difference is less than a first power threshold, determine that a fiber link between the testing device and the optical splitter is normal and the optical splitter is normal,
when the difference is between a first power threshold and a second power threshold, determine that a fiber link between the testing device and the optical splitter is faulty,
when the difference is between a second power threshold and a third power threshold, determine that the optical splitter is faulty; and
wherein the first power threshold is less than the second power threshold, and the second power threshold is less than the third power threshold.

8. The system according to claim 7, wherein the optical splitter is an optical splitter that reflects the testing optical signal according to a preset reflection ratio.

* * * * *